United States Patent [19]

Lumb et al.

[11] Patent Number: 5,364,678

[45] Date of Patent: Nov. 15, 1994

[54] WINDPROOF AND WATER RESISTANT COMPOSITE FABRIC WITH BARRIER LAYER

[75] Inventors: Douglas Lumb, Methuen; Moshe Rock, Andover, both of Mass.

[73] Assignee: Malden Mills Industries, Inc., Lawrence, Mass.

[21] Appl. No.: 163,021

[22] Filed: Dec. 6, 1993

Related U.S. Application Data

[63] Continuation-in-part of Ser. No. 9,153, Jan. 26, 1993, Pat. No. 5,268,212, which is a continuation of Ser. No. 788,913, Nov. 7, 1991, Pat. No. 5,204,156, which is a continuation-in-part of Ser. No. 468,027, Jan. 22, 1990, Pat. No. 5,126,182, which is a continuation-in-part of Ser. No. 422,850, Oct. 17, 1989, abandoned.

[51] Int. Cl.$^5$ .......................... B32B 5/04; B32B 5/18
[52] U.S. Cl. .......................... 428/96; 156/235; 156/238; 428/246; 428/248; 428/252; 428/253; 428/309.9; 428/315.9; 2/243.1; 2/93; 2/97
[58] Field of Search ............... 428/96, 248, 246, 252, 428/253, 309.9, 315.9; 156/235, 238

[56] References Cited

U.S. PATENT DOCUMENTS

| | | | |
|---|---|---|---|
| 5,126,182 | 6/1992 | Lumb et al. | 428/90 |
| 5,204,156 | 4/1993 | Lumb et al. | 428/96 |
| 5,268,212 | 12/1993 | Lumb et al. | 428/96 |

*Primary Examiner*—James C. Cannon
*Attorney, Agent, or Firm*—Stroock & Stroock & Lavan

[57] ABSTRACT

A stretchable, drapable, windproof, water resistant and water vapor permeable composite fabric including an inner layer of fabric, a first adhesive layer, a non-porous hydrophilic barrier layer, a second adhesive layer and an outer layer of fabric. At least one of the adhesive layers is of a hydrophilic material and may be continuous, and which joins the inner fabric layer to one side of the barrier layer, the second adhesive layer adhering the barrier layer to the outer fabric layer. The adhesive layers and the barrier layer are constructed to allow water vapor molecules to travel therethrough by a process of absorption-diffusion-desorption, but restrict the passage of wind and liquid water. The inner layer is formed of a hydrophobic material rendered sufficiently hydrophilic to permit wicking or formed with an inner surface formed of said material and an outer surface formed of a naturally absorbent material.

34 Claims, 2 Drawing Sheets

WINDPROOF AND WATER RESISTANT COMPOSITE FABRIC WITH BARRIER LAYER

CROSS-REFERENCE TO RELATED APPLICATIONS

This application is a continuation-in-part of U.S. patent application Ser. No. 08/009,153 filed Jan. 26, 1993 entitled COMPOSITE FABRIC WITH BARRIER LAYER, now U.S. Pat. No. 5,268,212, which is a continuation of U.S. patent application Ser. No. 07/788,913 filed on Nov. 7, 1991 entitled WINDPROOF AND WATER RESISTANT COMPOSITE FABRIC WITH BARRIER LAYER, now U.S. Pat. No. 5,204,156, which is a continuation-in-part of U.S. patent application Ser. No. 07/468,027 filed on Jan. 22, 1990 and entitled DRAPABLE, WATER VAPOR PERMEABLE, WIND AND WATER RESISTANT COMPOSITE FABRIC AND METHOD OF MAKING SAME, now U.S. Pat. No. 5,126,182, which itself is a continuation-in-part of U.S. patent application Ser. No. 07/422,850 filed on Oct. 17, 1989 entitled PRINTED FLOCKED FABRIC, now abandoned.

BACKGROUND OF THE INVENTION

This invention relates generally to a clothing material and, in particular to a drapable, stretchable, windproof and water resistant, water vapor permeable, composite fabric that can be used as outerwear.

Treatments to render fabrics wind and water resistant have been known for many years. However, it has been difficult to create fabrics which are suitable for apparel use and which are windproof, water resistant and water vapor permeable. It has also been difficult to create fabrics that are both water vapor permeable and wind resistant. In particular, it has been difficult to create a soft, stretchable, drapable, breathable, wind and water resistant fabric.

Conventional double-faced raised surface knit fabrics are porous and thus are not effective in sheltering the wearer from wind. In the past, a rubber layer has been adhered to a fabric substrate to impart wind and waterproof qualities and the exposed surface of the rubber layer was flocked.

Foamed adhesives have been used to adhere layers of flock in upholstery fabrics. These fabrics, however, have generally been formed using an open weave fabric, such as oshaburg, as a fabric substrate and do not have the degree of stretchability and drapability required for apparel fabrics.

Previously, a drapable, windproof, water resistant and water vapor permeable composite fabric has been formed by dispersing a thin layer of foamed adhesive between a fabric substrate and a layer of flocked fibers. The pores of the foamed adhesive are formed to be large enough to allow water vapor molecules to pass through, but are too small to allow air or liquid water molecules to pass through, except under pressure. This construction can render the fabric wind and water resistant, but early versions were neither sufficiently stretchable nor drapable for apparel use. In addition, as the wind and water resistance is improved, the water vapor permeability decreases. However, with the improvements taught in U.S. Pat. No. 5,126,182, a fabric suitable for apparel was produced, but still further improved characteristics were desired. Further, for some applications, a flocked outer surface is not satisfactory.

Accordingly, it is desirable to provide an improved windproof, water resistant and water vapor permeable fabric which eliminates the problems associated with prior art fabrics and to provide a novel, soft, stretchable, drapable water vapor permeable, windproof and water resistant composite fabric.

SUMMARY OF THE INVENTION

Generally speaking, in accordance with the invention, a drapable, stretchable, windproof, water resistant, water vapor permeable composite fabric is provided. The composite fabric includes an inner fabric layer, an outer fabric layer suitable for exterior use, a non-porous hydrophilic barrier intermediate said outer and inner layers, and an essentially hydrophilic adhesive layer joining both the inner and outer layers with the barrier. The adhesive and barrier layers are constructed to prevent air and water droplets from passing through the fabric layers while allowing water vapor to travel therethrough by absorption-diffusion-desorption. This renders the fabric windproof, yet breathable and water-resistant.

The barrier may be in the form of first and second non porous hydrophilic barrier layers adhered respectively to each of said inner and outer fabric layers.

The inner fabric layer may be a hydrophobic material such as polyester rendered sufficiently hydrophilic to provide moisture transport by wicking moisture away from the body. In an alternative embodiment, only the inner surface region of the inner layer may be polyester that has been rendered hydrophilic, while the outer surface region of the inner layer may be a natural absorbent material such as cotton. The inner fabric layer may have a knit construction and may have a raised inner surface facing the body of the wearer, and a flat (plain) outer surface facing away from the wearer. This outer surface of the inner layer may be adhered to the barrier by the adhesive layer.

In another embodiment, there is an inner fabric layer, a hydrophilic adhesive layer adhering to the outer surface of the inner fabric layer, a sub-barrier layer, a second sub-barrier layer adhered to the first sub-barrier layer, and a second adhesive layer adhering the second sub-barrier layer to the inner surface of an outer fabric layer. The barrier may be adhered to one of the inner or outer layers of fabric by transfer coating from a carrier on an adhesive. The barrier may also be cast directly onto an adhesive coated fabric or the barrier may be an extruded film that is deposited onto an adhesive coated fabric. The barrier may be formed of polyurethane.

Accordingly, it is an object of the invention to provide a composite fabric incorporating a hydrophilic barrier layer and an improved adhesive layer for adhering a layer of fabric to a barrier layer.

Another object of the invention is to provide a windproof fabric which is water resistant.

A further object of the invention is to provide a composite fabric which is insulative against wind chill.

A still further object of the invention is to provide a fabric which is water resistant.

Another object of the invention is to provide a water resistant composite fabric having stretchability and drapability suitable for apparel.

Yet another object of the invention is to provide a fabric which is liquid water resistant and water vapor permeable.

Still another object of the invention is to provide an improved composite fabric which is windproof.

Still another object of the invention is to provide improved outerwear material.

Still other objects and advantages of the invention will in part be obvious and will in part be apparent from the specification.

The invention accordingly comprises the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
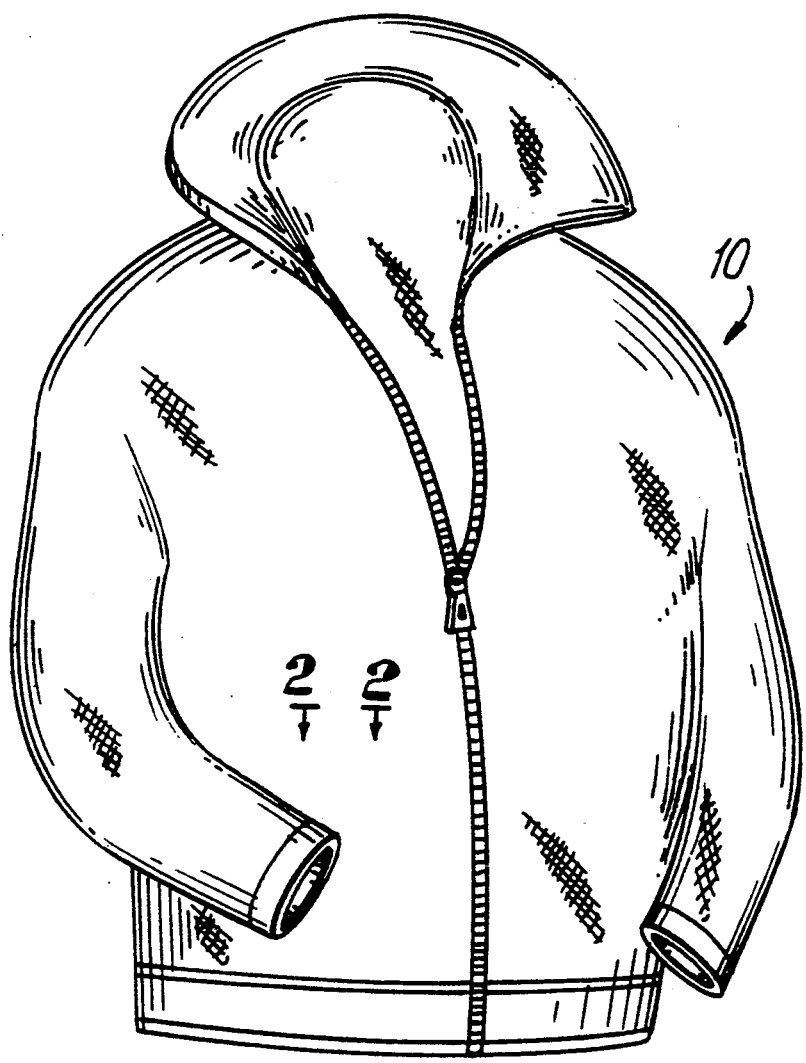
FIG. 1 is a perspective view of a garment made from a composite fabric constructed in accordance with the invention.

Composite fabric material constructed in accordance with the invention is formed with a first layer of outer fabric material, a windproof and water resistant barrier formed of a non-porous hydrophilic material which may be adhered thereon with an adhesive layer, and a second layer of inner fabric material which may be adhered to the barrier layer with an adhesive layer. The barrier may consist of two layers each adhered to one of the inner and outer fabric layers and joined by an adhesive layer. The one or more adhesive layers are preferably formed of a hydrophilic material and may be continuous.

The inner fabric layer may be formed with an inner surface (for facing the wearer's body) that is raised and an outer surface that is flat. The inner fabric layer may be formed of a hydrophobic material such as polyester which is rendered sufficiently hydrophilic to promote moisture transport, so that the inner fabric will transport moisture from the body to the plain outer surface of the inner layer (and the surface of the barrier or an adhesive layer). In one embodiment, the inner fabric layer is a composite fabric with at least its inner surface region formed of polyester that has been rendered hydrophilic and the balance formed of another material which is naturally absorbent such as cotton and/or another material that has been rendered sufficiently hydrophilic.

There are also several other embodiments that can form the inner fabric layer. For example, the inner surface region can be a coarse denier polyester that has been rendered hydrophilic and the balance formed of another material such as fine denier polyester which has also been rendered sufficiently hydrophilic. The inner surface region can also be a polyester that has been rendered somewhat hydrophilic and the balance of the inner fabric layer including the outer surface being of a polyester which has been rendered more completely hydrophilic. Further embodiments contemplate the inner surface region formed of a filament polyester that has been rendered hydrophilic and an outer surface region formed of spun yarn polyester which has also been rendered hydrophilic. Lastly, the inner surface region may be formed of a round, cross-section polyester that has been rendered hydrophilic and an outer surface region being an irregular cross-section (i.e. grooved) polyester which has also been rendered sufficiently hydrophilic. It is also to be understood that several of the above inner and outer surface embodiments can also be combined. For example, an inner surface region formed of a filament polyester can be combined with an outer surface region which is an irregular cross-section (i.e. grooved) polyester.

When the inner fabric is constructed with a plain outer surface and an inner surface having raised portions extending therefrom, the adhesive layer and/or barrier layer is preferably disposed on the plain surface. A particularly well suited barrier is formed from a hydrophilic polyurethane and may be derived from a solvent based system. The hydrophilic polyurethane is formed so that moisture will pass therethrough by an absorption-diffusion-desorption process. Such a polyurethane barrier is non-porous and formed so that body moisture will be transported therethrough, while being sufficiently resistant to the passage of water droplets. The thickness of the barrier or polyurethane layer can be selected to balance breathability and degree of water resistance. In addition, the barrier could be partially hydrophobic, in that there are fewer pores/mm$^2$ than in a true hydrophobic barrier. Therefore, the moisture will pass through the hydrophilic portion of the barrier by an absorption-diffusion-desorption process and through the micropores of the hydrophobic portion.

The barrier layer may be an aromatic or an aliphatic polyurethane and can contain: a polyfunctional isocyanate to promote cross-linking, melamine to promote adhesion, aliphatic polyamine to catalyze curing and a fluorocarbon resin for water repellency. A microporous film, permeable to water vapor but impervious to liquid water can also be used. Such a film would be hydrophobic. The barrier layer should be formed to be soft and to have the ability to stretch and recover. It may also preferably be formed to have the ability to adhere to at least one fabric layer without the necessary application of an intervening adhesive between the barrier layer and the layer of fabric if desired. A preferred polyurethane material is available from UCB Chemical Corp., located in Drogenbos, Belgium.

The outer fabric layer will usually be hydrophobic. The outer fabric can be formed of 100% polyester, such as polyester fleece having terry loop construction, and can have a plain inner surface with a raised outer fabric surface extending therefrom. The outer fabric can also be a stretch material. The outer fabric can also be made from acrylic, cotton, nylon, wool, rayon or a combination thereof, and can also be rendered water repellant by conventional chemical treatments.

In another embodiment of the invention, a first sub-barrier layer is adhered by an adhesive layer or by its own properties to the outer surface of the inner fabric layer and a second sub-barrier layer may also be adhered directly to the inner surface of the outer fabric layer or by an adhesive layer. The two sub-barrier layers are disposed on and adhered to each other to form the desired barrier layer. In such a case, the sub-barrier layers may be joined by heat and/or pressure or the sub-barrier layers can also be adhered to each other by an adhesive layer. In this embodiment, one or more of the adhesive layers may be a hydrophilic material, which may be continuous. As used herein, continuous means that the adhesive covers essentially the entire surface to be joined. Discontinuous hydrophilic adhesives can be used.

Figure 2:
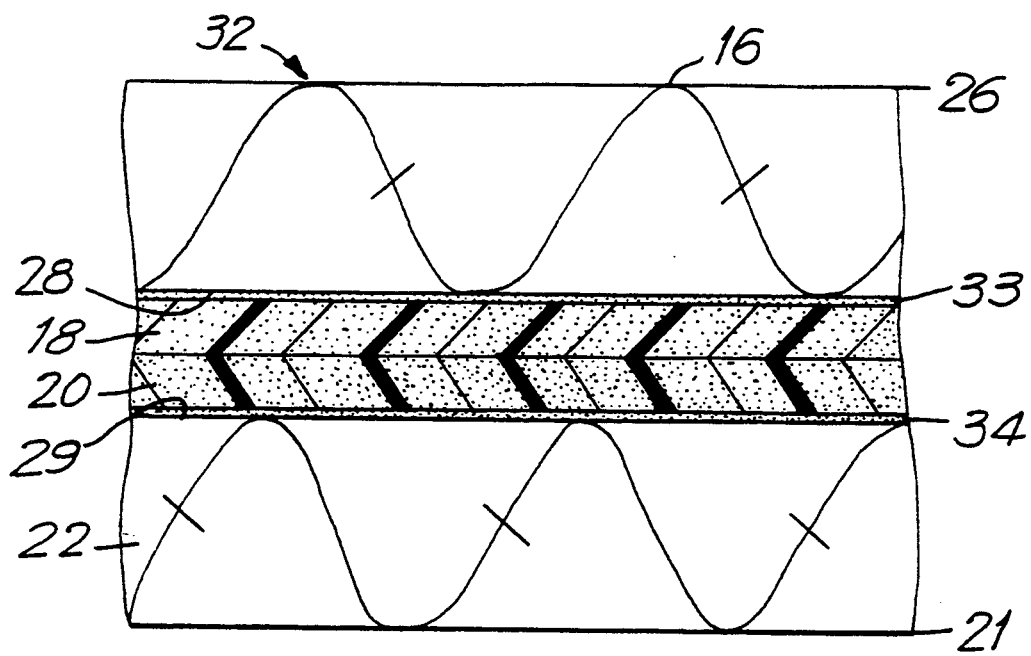
FIG. 2 is an enlarged partial cross-sectional view taken along line 2—2 of the garment in FIG. 1.

Reference is made to FIGS. 1 and 2 wherein a garment, indicated generally at 10, is depicted. Garment 10 (i.e., a jacket) is made from a composite fabric in accordance with an embodiment of the invention, indicated generally at 32. Composite fabric 32 includes an inner fabric layer 16 having first sub-barrier layer 18 adhered to inner layer 16 by adhesive layer 33 and second sub-barrier 20 adhered to outer layer 22 by a second adhesive layer 34. Adhesive layers 33 and 34 are both preferably formed of a hydrophilic material which may be continuous, although one of the adhesive layers may be formed of a hydrophobic material which must be micro-porous (and should be discontinuous) to permit passage of water vapor therepast. Inner fabric layer 16 includes a raised surface 26 and a plain surface 28. Sub-barrier layers 18 and 20 are made of hydrophilic polyurethane and are windproof and water resistant. Outer fabric layer 22 includes a plain surface 29 and a raised surface 21. At least one of adhesive layers 33 and 34 is formed of a hydrophilic material and may be continuous.

In one method of constructing the fabric of FIG. 2, sub-barrier layers 18 and 20 are each laid on a carrier such as paper (not shown). Sub-barrier layer 18 is transferred from its carrier to adhesive layer 33 or directly to surface 28 of inner fabric layer 16, and second sub-barrier layer 20 is transferred from its carrier to adhesive layer 34. This method, referred to as transfer coating is advantageous because it allows for the precise control of barrier weight and thickness and allows the use of thinner and lighter barrier layers. Sub-barrier layers 18 and 20 are then adhered to each other by heat and/or pressure to form composite fabric 32 as shown in FIG. 2.

Inner fabric layer 16 can be made from acrylic, cotton, nylon, polyester, wool, rayon or a combination thereof. It can be treated to provide moisture transport to wick the moisture from the wearer and raised surface 26 facing the wearer to plain surface 28. Moisture is then transferred through sub-barrier layers 18 and 20, and both of adhesive layers 33 and 34 of FIG. 2, by a process of absorption-diffusion-desorption directly to outer fabric layer 22 in the embodiment of FIG. 2.

In one embodiment, outer fabric layer 22 is a circular weft knit polyester terry loop fabric. The loop and stitch yarn may be filament or spun. If the loop yarn is filament, it is from about 70 to about 150 denier, preferably about 100 denier. If the stitch yarn is filament, it is between from about 70 to about 200 denier, preferably about 100 denier. The fabric layer is from about 0.030 to about 0.30 inches thick, preferably about 0.070 inches thick. However, this fabric layer is described by way of example and not by way of limitation. Outer fabric layer 22 can be a stretch material, nylon shell material and many other types of fabrics. Outer fabric layer 22 may be dyed conventionally with, for example, disperse dyes, and it can be treated to be water repellant.

Figure 3:
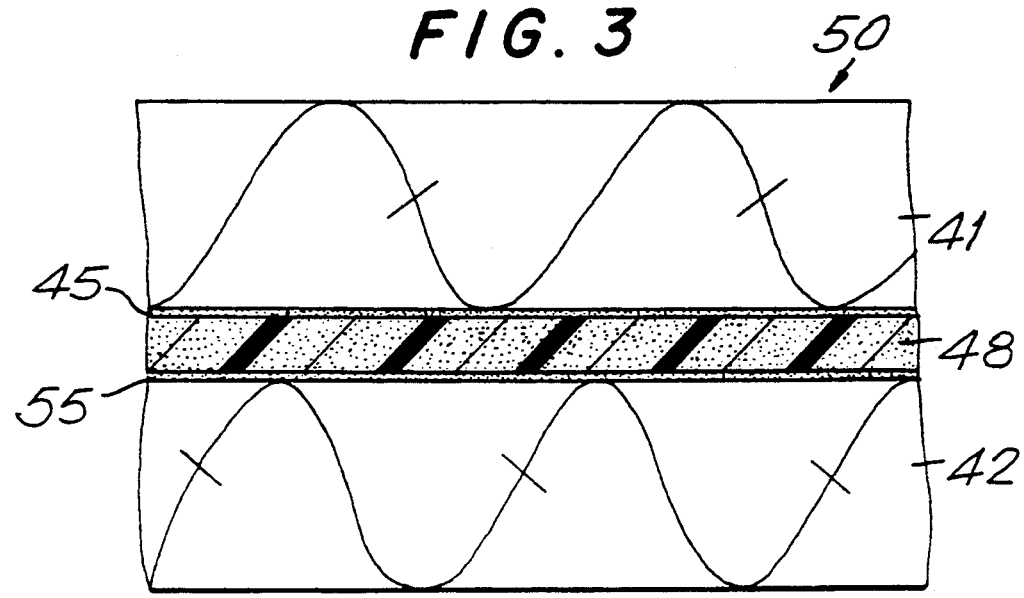
FIG. 3 is an enlarged partial cross-sectional view of a composite fabric constructed in accordance with a second embodiment of the invention.

Referring to FIG. 3, a composite fabric 50 constructed in accordance with another embodiment of the invention is shown. Fabric 50 is formed with a first fabric layer 41 adhered to barrier layer 48 by an adhesive layer 45. A second adhesive layer 55 adheres barrier layer 48 to outer fabric layer 42. One or both of adhesive layers 45 and 55 of FIG. 3 are formed of a hydrophilic material and may be continuous. Barrier layer 48 is preferably formed of a hydrophilic polyurethane to permit moisture to pass through by an absorption-diffusion-desorption process. The materials for forming fabric 40 can be the same as those described above, except that fabric 40 includes a single barrier layer.

Referring to FIGS. 2 and 3, in accordance with the invention, the adhesive layers may be applied by any known method including application by doctor blades. The various barrier or sub-barrier layers can also be formed of a micro-porous hydrophobic material but particular advantages are obtained from the combination of a hydrophilic barrier and adhesive layers.

It has been found that the combination of a composite fabric, as discussed above, with a hydrophilic adhesive layer that is continuous, provides unanticipated advantages as noted below. Specifically, a hydrophilic adhesive layer that is continuous, provides a means of transporting moisture through the adhesive layer by an absorption-diffusion-desorption process to the barrier layer or to the outer layer.

A hydrophilic adhesive layer and a hydrophilic barrier layer containing an amount of moisture below their respective capacities are considered unsaturated. Moisture as water vapor is passed from the inner layer of fabric through such an unsaturated adhesive layer or barrier layer at a relatively low transfer coefficient (rate). However, it has been discovered that when a hydrophilic adhesive and/or barrier layer is saturated by moisture, an unexpected and dramatic increase in the water vapor transfer coefficient of both the hydrophilic adhesive layer and the hydrophilic barrier layer results.

To maximize water transfer from the body of the wearer, the inner layer of fabric has a raised inner surface, therefore transporting more water from the wearer due to the greater amount of surface area on the inner layer. Further the inner layer is preferably formed of a polyester material rendered hydrophilic or of a composite of natural and hydrophilic materials as described above. This construction maximizes wicking of water through the inner fabric layer. An increase in water wicked through the inner fabric layer to the outer surface thereof adjacent an adhesive layer formed of a hydrophilic material will cause the first adhesive layer to rapidly become saturated. Once the first adhesive layer is saturated, the barrier will become saturated and, thereafter, the second hydrophilic adhesive layer becomes saturated. Once saturated, the barrier layer and both hydrophilic adhesive layers are activated causing an unexpected reaction where the amount of water vapor passed from the inner layer fabric through the adhesive and barrier layers is dramatically increased. This combination offers the advantage of being capable of removing water vapor at a faster rate when required under heavy water load situations. Since more water vapor passes through the fabric, less body moisture will be trapped against the wearer resulting in a more comfortable, breathable outer garment. The raised inner surface of the inner layer offers the added advantage of permitting some air to remain on the interior of the fabric between the wearer and the fabric to aid in the fabric's insulation properties, as well as distancing the adhesive and barrier layers from the wearer's skin, a distance greater than would normally be the case with a flat fabric, thereby separating the wearer from a saturated adhesive layer and a saturated barrier layer.

As noted, the barrier layer may be non-porous and hydrophilic or micro-porous and hydrophobic or any combination thereof. If the barrier is non-porous and hydrophilic, moisture vapor travels through the barrier by an absorption-diffusion-desorption process to the outer fabric layer where it is removed to the environment. If the barrier layer is micro-porous and hydrophobic, moisture vapor is transported through the barrier's micro-pores to the outer fabric layer where it is removed to the environment. If there is a second adhesive layer between the barrier layer and the outer layer of fabric, moisture vapor will first be transferred to the adhesive layer from the barrier layer, where the moisture will pass through the adhesive layer to the outer fabric layer where it is removed to the environment.

The outer fabric should be suitable for apparel use. It, like the inner layer, may have a knit construction and may be rendered hydrophilic. Furthermore, the outer layer may be flat or comprised of an inner surface that is flat and an outer surface that is raised. An outer fabric layer that has a hydrophobic outer layer or a water repellant outer layer, or which has been treated chemically to be water resistant, will not allow water from the exterior of a garment (rain and snow) from gaining access to the barrier layer. This results in an improved fabric which will wick more water vapor from the wearer, but will still remain stretchable, windproof and water resistant and will be more comfortable for the wearer.

When composite fabrics 12, 40 or 50 are used for outerwear, they can provide a breathable fabric which enables water vapor from the wearer to pass through the fabric which therefore will not trap body moisture. However, it will substantially prevent rain water droplets from reaching the wearer. The result is great comfort. The composite fabric of the invention can provide water resistance so that the garment can be used in rainy weather or in snow. Fabric in accordance with the invention can maximize this characteristic without undue sacrifice of the breathability or wind resistance of the garment.

While breathable, composite fabrics 12, 40 and 50 are essentially impervious to moving air. Therefore, whether the wearer is exposed to windy conditions or creates a windy condition by moving rapidly through still air, the wearer is insulated from the effects of wind chill.

The resultant composite fabric has good drapability, feel and appearance characteristics making it particularly suited for garments- It is also durable, stretchable and comfortable.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A stretchable, drapable, water vapor permeable, windproof and water resistant composite fabric for use in a garment comprising:
   an outer layer of fabric;
   an inner layer of fabric having a raised inner surface and a plain outer surface and formed from sufficiently hydrophilic material to permit wicking of moisture from the raised inner surface of the inner layer to said plain outer surface thereof;
   barrier means for providing resistance to wind and liquid water while providing for water vapor transport through absorption-diffusion-desorption, including a non-porous hydrophilic barrier layer;
   a hydrophilic adhesive layer, said adhesive layer affixing at least one of said outer surface of said inner layer of fabric or the inner surface of said outer layer of fabric to said barrier means; and
   said other of said outer surface of said inner layer of fabric or said inner surface of said outer layer of fabric being disposed on and adhered to said barrier layer.

2. The composite fabric of claim 1, wherein said adhesive layer is continuous.

3. The composite fabric of claim 1, wherein said adhesive layer joins said barrier layer to said outer surface of said inner layer of fabric.

4. The composite fabric of claim 1, wherein said adhesive layer joins said barrier layer to said inner surface of said outer layer of fabric.

5. The composite fabric of claim 1, wherein said adhesive layer joins said outer surface of said inner layer of fabric to said barrier layer, and including a second hydrophilic adhesive layer joining said barrier layer to said inner surface of said outer layer of fabric.

6. The composite fabric of claim 5, wherein said second adhesive layer is continuous.

7. The composite fabric of claim 1, wherein said inner layer of fabric is formed from an essentially hydrophobic material which has been rendered sufficiently hydrophilic.

8. The composite fabric of claim 1, wherein said inner layer of fabric is formed from polyester which has been rendered sufficiently hydrophilic.

9. The composite fabric of claim 1, wherein said inner fabric layer includes an inner surface formed of a polyester which has been rendered sufficiently hydrophilic and an outer surface formed of a naturally absorbent material.

10. The composite fabric of claim 1, wherein said naturally absorbent material is cotton.

11. The composite fabric of claim 1, wherein said outer fabric layer is hydrophobic.

12. The composite fabric of claim 11, wherein said outer fabric layer has a raised outer surface and a plain inner surface on the side adjacent said barrier layer.

13. The composite fabric of claim 11, wherein said outer fabric is an essentially flat shell material.

14. The composite fabric of claim 1, wherein said outer fabric layer is treated to be water repellant.

15. The composite fabric of claim 14, wherein said outer fabric layer has a raised outer surface and a plain inner surface adjacent said barrier layer.

16. The composite fabric of claim 14, wherein said inner fabric layer includes an inner layer formed of a polyester which has been rendered sufficiently hydrophilic and an outer layer formed of a naturally absorbent material.

17. The composite fabric of claim 16, wherein said outer fabric is an essentially flat shell material.

18. The composite fabric of claim 1, wherein said outer layer of fabric is essentially formed of polyester.

19. The composite fabric of claim 1, wherein said barrier means includes a second hydrophilic barrier layer disposed on and adhered to said first-mentioned barrier layer, said first-mentioned barrier layer being disposed on and adhered to said inner fabric layer, and said second barrier layer being disposed on and adhered to said outer fabric layer, said adhesive layer joining at least one of said outer surface of said inner layer of fabric to the first-mentioned of said barrier layers or said second barrier layer to said inner surface of said outer layer of fabric.

20. The composite fabric of claim 19, and including a second hydrophilic adhesive member joining the other of said outer surface of said inner layer of fabric to the first-mentioned of said barrier layers or said second barrier layer to said inner surface of said outer layer of fabric.

21. The composite fabric of claim 20, wherein said second adhesive layer is continuous.

22. The composite fabric of claim 19, wherein said inner fabric layer includes an inner layer formed of a polyester which has been rendered sufficiently hydrophilic and an outer layer formed of a naturally absorbent material.

23. The composite fabric of claim 1, wherein said barrier layer is formed from an essentially non-porous hydrophilic material.

24. The composite fabric of claim 1, wherein said outer layer of fabric and said inner layer of fabric are both a stretchable material.

25. The composite fabric of claim 1, wherein said outer layer of fabric and said inner layer of fabric are both raised surface knit fabrics.

26. The composite fabric of claim 19, wherein said first-mentioned and second barrier layers are adhered to each other with the use of a non-porous hydrophilic material.

27. A stretchable, drapable, water vapor permeable, windproof and water resistant composite fabric for use in a garment comprising:

an outer layer of fabric;

an inner layer of fabric having a raised inner surface and a plain outer surface and formed from sufficiently hydrophilic material to permit wicking of moisture from the raised inner surface of the inner layer to said plain outer surface thereof;

barrier means for providing resistance to wind and liquid water while providing for water vapor transport through absorption-diffusion-desorption including an essentially non-porous hydrophilic first barrier layer disposed on and adhered to said outer surface of said inner fabric layer and an essentially non-porous hydrophilic second barrier layer disposed on and adhered to said inner surface of said outer fabric layer; and a hydrophilic adhesive layer joining said first and second barrier layers.

28. The composite fabric of claim 27, wherein said adhesive layer is continuous.

29. The composite fabric of claim 27, wherein said inner layer of fabric is formed from an essentially hydrophobic material which has been rendered sufficiently hydrophilic.

30. The composite fabric of claim 27, wherein said inner layer of fabric is formed from polyester which has been rendered sufficiently hydrophilic.

31. The composite fabric of claim 27, wherein said inner fabric layer includes an inner layer formed of a polyester which has been rendered sufficiently hydrophilic and an outer layer formed of a naturally absorbent material.

32. The composite fabric of claim 27, wherein said naturally absorbent material is cotton.

33. The composite fabric of claim 27, wherein said outer fabric layer is treated to be water repellant.

34. The composite fabric of claim 27, wherein said outer fabric layer is formed of a hydrophobic material.

* * * * *

UNITED STATES PATENT AND TRADEMARK OFFICE
CERTIFICATE OF CORRECTION

PATENT NO.    : 5,364,678
DATED         : November 15, 1994
INVENTOR(S)   : Lumb et al.

It is certified that error appears in the above-identified patent and that said Letters Patent is hereby corrected as shown below:

Title page,
Item [75], Inventors, please add -- Mark Shanley --

Signed and Sealed this

Thirtieth Day of November, 2004

JON W. DUDAS
*Director of the United States Patent and Trademark Office*